United States Patent [19]

Koser

[11] 4,170,157
[45] Oct. 9, 1979

[54] TRIMMING PIPE BENDS

[76] Inventor: Rolf Koser, 160, Holser Strasse, D-4980 Bunde, Fed. Rep. of Germany

[21] Appl. No.: 865,660

[22] Filed: Dec. 29, 1977

[51] Int. Cl.² ............................................. B23D 19/08
[52] U.S. Cl. ....................................... 83/472; 72/294; 72/324; 72/340; 83/914
[58] Field of Search ................ 72/294, 324, 334, 340, 72/367, 369; 29/157 A; 83/471.2, 472, 914, 3; 228/170, 171; 82/53, 53.1

[56] References Cited

U.S. PATENT DOCUMENTS

| 1,781,567 | 11/1930 | Bohling | 29/157 A |
|---|---|---|---|
| 2,516,372 | 7/1950 | Cross | 72/369 |
| 3,183,702 | 5/1965 | Zittell | 72/294 |
| 3,772,946 | 11/1973 | Sarra | 83/914 |
| 4,043,167 | 8/1977 | Koser | 72/340 |

*Primary Examiner*—Michael J. Keenan
*Attorney, Agent, or Firm*—William Anthony Drucker

[57] ABSTRACT

A machine for the trimming of a pipe bend held in a die in a machine frame has two hydraulic rams mounted at 45°, the piston rod of each ram carrying one of a pair of rotary cutting devices for trimming respective ends of the pipe bend. Under the two hydraulic rams there are arranged, each on a respective inclined guide way and likewise at an angle of 45° in the machine frame, movable swarf or burr removing chamfering devices moving to bring their rotary cutter head coaxially into engagement with a respective trimmed end of the pipe bend.

2 Claims, 1 Drawing Figure

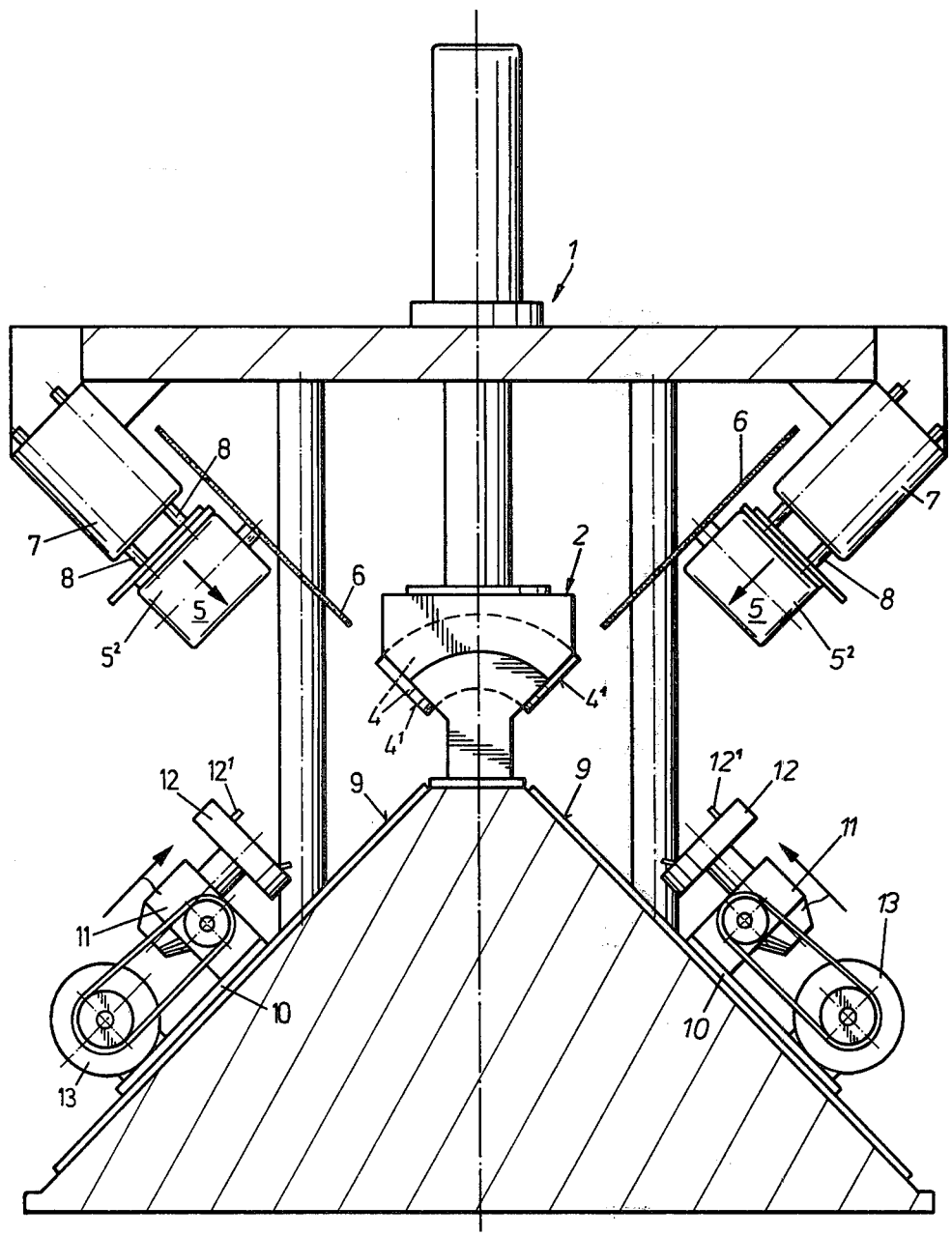

TRIMMING PIPE BENDS

The object of the invention is a machine for the calibration and trimming of a pipe bend manufactured on a pipe bending press.

Pipe bends are already known in the art. Complete pipe bends are prepared with calculated lengths, that is to say the pipes are cut to the required lengths and are led over the bending mandrel one after the other. By this method the piece of pipe forms itself into a pipe bend. There also emerges from the pipe bending press a bent pipe bend the bending radius of which can lie between 15° and 180°.

According to the kind and the production of the materials to be used, the pipe bends emerge from the pipe bending press with a temperature between 700 and 900 degrees Celsius. Because of the method of forming, these pipe bends are not identical so far as concerns their cross section, and must be calibrated. After the calibration it is necessary to cool the pipe bends before a further operation.

After the pipe bend is sufficiently cooled, it passes into the so-called sawing station. Here the pipe bend is cut, by means of two- or three-cut saws to the required degree of bend. During the cutting of the pipe bend the measurement precision always lies in the upper field of tolerance. Occasionally, this tolerance field will be exceeded, and another additional after-operation on the pipe bend by means of further cold calibration is necessary. This cold calibration is nevertheless only an end calibration, that is to say, the ends of the pipe bend, on the above described junction measurement are brought within the tolerance field.

If now during this end calibration the angle of the pipe bend is affected, then re-grinding is necessary. Regrinding will also be necessary if the pipe bend has not been precisely clamped up to the saw blade which will then make an oblique cut. All this finishing work which is necessary to keep within the prescribed tolerance limits is mainly manual work involving high cost. Recently tolerances for pipe or tube bends used in marine engineering have been further tightened with a consequential rise in the cost of production due to the extra finishing work It is therefore advantageous, in the process of complete preparation of pipe bends, that as well as the hot calibration and seaming there can be a de-burring of the correctly dimensioned seamed pipe bend ends.

The following description serves for the disclosure of the invention, of which an embodiment is illustrated in front elevation in the drawing.

There is provided an upright die 2 in a machine frame 1. Two cutting devices 5 move diagonally from the top to the bottom.

An electric motor $5^2$ provided with a rotary cutting or trimming tool 6 is carried by a piston rod 8 of a hydraulic ram 7.

In order now to be able to grind the pipe bend 4 at both ends for the formation of a subsequent seam for welding there are provided in the machine frame 1 suitable burr and swarf removing chambering devices having a carriage 10. These devices are guided by means of slots in an inclined slide way 9 and consist of a translatory drive 11 with electric motor 13, and the translatory drive 11 has a rotary cutter head 12 with cutting knives $12^1$.

The method of operation is as follows:

The pipe bend 4, coming in heated condition out of a pipe bend press (not shown) is manually or mechanically placed in the die 2 in the machine frame 1. For hot calibration the two part die 2 is closed by a known means. During the calibration, the cutting devices 5 are moved by the ram 7 in the machine frame 1 and cut off the overhanging ends $4^1$ of the pipe bend 4, whereby a true and ready pipe bend 4 is obtained and needs no further working operation.

Simultaneously with the return travel of the two cutting devices 5, there is a forwards movement of burr and the swarf removing devices, which means that the carriage 10 with the rotating cutting knives $12^1$ thereon, is moved coaxially in the direction of the pipe bend. The cutting knives $12^1$ engage coaxially with the dimensioned seamed ends of the pipe bend 4 and carry out an end grinding or chamfering which is required for a later trouble free welding seam.

The above described working process now makes it possible that, with a single machine, a pipe bend with a temperature of 700 to 900 degrees Celsius taken out and calibrated within the range of temperature, can be cut to desired dimensions and prepared for the carrying out of a good welding seam.

The advantages as compared with the known art is to be seen that the pipe bends, which are hot calibrated in the die and simultaneously seemed at both ends, have a dimensional correctness which hitherto only could be achieved with costly after-operations.

I claim:

1. A machine, for the treatment of a pipe bend, comprising:
    (i) a machine frame
    (ii) means in said frame for holding a pipe bend in a predetermined position relative to the frame
    (iii) two hydraulic rams each including a cylinder mounted on the machine frame, and a piston movable in the cylinder
    (iv) two rotary cutter means each carried by a respective one of the pistons, the hydraulic rams being positioned on the frame in relation to the holding means such that each cutter means is movable by its ram normally to the axis of a respective end of the pipe bend, thereby to trim an end portion from the pipe bend
    (v) a pair of slideways on the machine frame
    (vi) two swarf and burr-removing chamfering devices each carried on and movable along a respective one of the slideways, each chamfering device including a rotary cutting head, each slideway being positioned on the frame such that the respective rotary cutting head is movable coaxially towards and away from a respective trimmed end of the pipe bend.

2. A machine, as claimed in claim 1, wherein the rotary cutting head has at least two cutting knives to act on the trimmed pipe bend end.

* * * * *